United States Patent
Robins et al.

(10) Patent No.: US 11,233,275 B2
(45) Date of Patent: Jan. 25, 2022

(54) COATED LEAD ACID BATTERY SEPARATOR AND LEAD ACID BATTERIES CONTAINING COATED SEPARATOR

(71) Applicant: TROJAN BATTERY COMPANY, LLC, Santa Fe Springs, CA (US)

(72) Inventors: Louise Robins, Sligo (IE); Cormac O'Keeffe, Sligo (IE); Marvin Ho, Hammond, IN (US); Michael A. Everett, Santa Fe Springs, CA (US)

(73) Assignee: Trojan Battery Company, LLC, Santa Fe Springs, CA (US)

(*) Notice: Subject to any disclaimer, the term of this patent is extended or adjusted under 35 U.S.C. 154(b) by 461 days.

(21) Appl. No.: 16/231,080

(22) Filed: Dec. 21, 2018

(65) Prior Publication Data

US 2019/0198936 A1 Jun. 27, 2019

Related U.S. Application Data

(60) Provisional application No. 62/609,203, filed on Dec. 21, 2017, provisional application No. 62/609,219, filed on Dec. 21, 2017.

(51) Int. Cl.
*H01M 10/12* (2006.01)
*H01M 4/22* (2006.01)
*H01M 4/73* (2006.01)
*H01M 4/56* (2006.01)
*H01M 4/66* (2006.01)
*H01M 4/68* (2006.01)
(Continued)

(52) U.S. Cl.
CPC ............ *H01M 10/12* (2013.01); *H01M 4/22* (2013.01); *H01M 4/366* (2013.01); *H01M 4/56* (2013.01); *H01M 4/662* (2013.01); *H01M 4/685* (2013.01); *H01M 4/73* (2013.01); *H01M 50/403* (2021.01); *H01M 50/411* (2021.01); *H01M 50/4295* (2021.01); *H01M 50/431* (2021.01); *H01M 50/44* (2021.01); *H01M 50/449* (2021.01); *H01M 50/46* (2021.01)

(58) Field of Classification Search
CPC .... H01M 50/4295; H01M 4/73; H01M 4/685; H01M 4/662; H01M 4/56; H01M 4/366; H01M 4/22; H01M 50/411; H01M 50/431; H01M 50/449; H01M 50/46; H01M 50/44; H01M 50/403; H01M 10/12
See application file for complete search history.

(56) References Cited

U.S. PATENT DOCUMENTS 4,855,196 A * 8/1989 Eggers .................... H01M 4/76
429/139
6,268,081 B1 * 7/2001 Clough ............. H01M 10/4235
429/215
(Continued)

OTHER PUBLICATIONS

Definition of arrange (Year: 2021).*

*Primary Examiner* — Alexander Usyatinsky
(74) *Attorney, Agent, or Firm* — Duane Morris LLP

(57) ABSTRACT

An electrospun coated component for a lead acid battery is disclosed. The electrospun coated component includes positive electrode, negative electrode, and separator. The separator may comprise a low-conducting and/or non-conductive material. A method of electrospun coating these components of a LAB is provided. Suitable compositions and conditions for electrospun coating on to LAB components are further provided in this disclosure.

16 Claims, 13 Drawing Sheets

(51) Int. Cl.
*H01M 4/36* (2006.01)
*H01M 50/44* (2021.01)
*H01M 50/46* (2021.01)
*H01M 50/403* (2021.01)
*H01M 50/411* (2021.01)
*H01M 50/431* (2021.01)
*H01M 50/449* (2021.01)
*H01M 50/429* (2021.01)

(56) References Cited

U.S. PATENT DOCUMENTS

| | | | |
|---|---|---|---|
| 2011/0318629 A1* | 12/2011 | Ho | H01M 50/431 |
| | | | 429/144 |
| 2012/0070727 A1* | 3/2012 | Wertz | H01M 4/62 |
| | | | 429/188 |
| 2013/0224602 A1* | 8/2013 | Huang | H01M 50/411 |
| | | | 429/249 |
| 2016/0190656 A1* | 6/2016 | La | B29C 48/05 |
| | | | 429/144 |

* cited by examiner

54

92   94

FIG. 11A
FIG. 11B
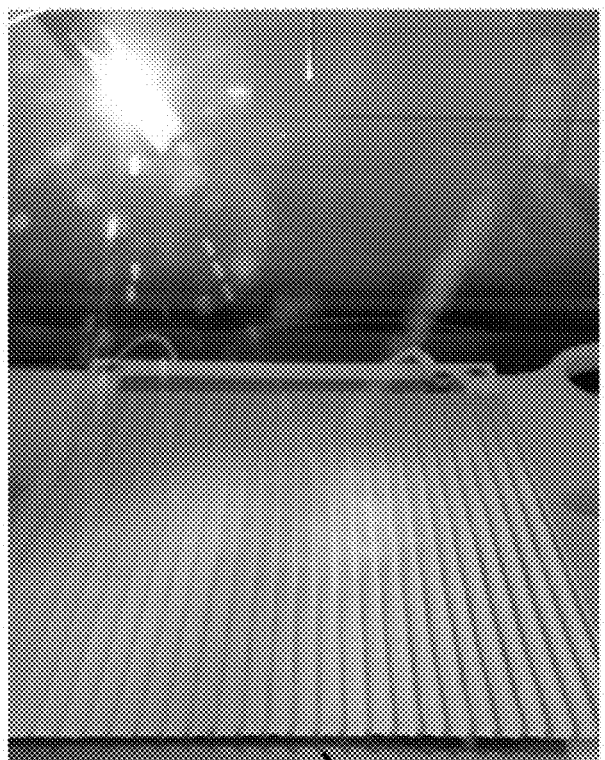
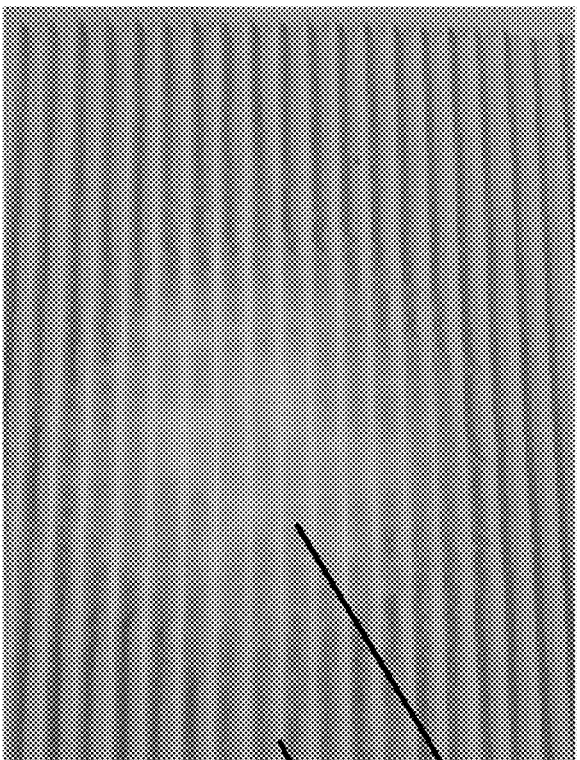
112  114  116

132

COATED LEAD ACID BATTERY SEPARATOR AND LEAD ACID BATTERIES CONTAINING COATED SEPARATOR

CROSS-REFERENCE TO RELATED APPLICATIONS

The present application claims priority benefit under 35 U.S.C. § 119(e) from U.S. Provisional Application No. 62/609,203, filed Dec. 21, 2017, entitled "Coated Lead Acid Battery Components; Method For Making Coated Components And Lead Acid Batteries Containing Coated Components," and from U.S. Provisional Application No. 62/609,219, filed Dec. 21, 2017, entitled "Coated Lead Acid Battery Components And Method For Making Same."

FIELD

This disclosure relates to the chemical and mechanical arts. In particular, this disclosure relates to components used in lead acid batteries, a method for making the components and lead acid batteries containing the components.

BACKGROUND

Flooded lead acid batteries are formed with a housing containing a positive plate and a negative plate separated by separator and all immersed in an acidic electrolyte. Typically, the positive and negative plates are comprised of an electrode grid alloyed with antimony to which a paste of lead oxide, sulfuric acid and water is applied. It is a drawback of such plates that the antimony may leach or migrate out of the positive electrode. Once the antimony deposits on the surface of negative electrode, it will change potential of negative electrode and cause the battery to be overcharged easily during application. This will undesirably shorten battery life.to improve their mechanical characteristics.

Rubber is known to be an effective barrier for preventing or delaying the antimony from leaching from the positive electrode to the negative electrode and it is known to use separators comprised of a rib structure and a porous mat based on natural rubber. However, there are numerous drawbacks to the use of a natural rubber separator including poor integration of the hydrated silica filler producing pinholes, low porosity, poor permeability and high electrical resistance. Furthermore, when the natural rubber separator is immersed in the acidic electrolyte of a flooded lead-acid battery, it may oxidize and crack. When a rubber separator cracks, lead dendrites may grow from the negative to the positive electrode, thus causing the battery to short circuit.

Due to these drawbacks and to the expense of rubber, some manufacturers have abandoned the use of rubber altogether, instead, preferring to use a polymer separator for flooded lead-acid batteries. A polymer separator is much sturdier than a rubber separator, and thus does not tend to split when used in a flooded-lead acid battery. Such a polymeric separator may prevent the short circuits caused by lead dendrite growth, but does not prevent antimony migration. Thus, batteries using only a polymer separator have shortened battery life

SUMMARY

Several aspects of the present invention will be described more fully hereinafter with reference to various embodiments of coated lead acid battery components and methods for making lead acid batteries containing coated components.

An example of a coated separator for a lead acid battery includes a separator and a porous, non-woven mat comprising polymer fibers arranged with the separator.

Another example of a coated separator for a lead acid battery includes a separator and an electrospun coating comprising polymer fibers arranged with the separator.

An example of a lead acid battery includes a positive electrode plate, a negative electrode plate, and a separator between the positive and negative plates, wherein the separator comprises a porous, non-woven mat comprising polymer fibers.

Another example of a lead acid battery includes a positive electrode plate, a negative electrode plate, and a separator between the positive and negative plates, wherein the separator comprises a polymeric electrospun coating.

It will be understood that other aspects of the present invention will become readily apparent to those skilled in the art from the following disclosure, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive

BRIEF DESCRIPTION OF THE DRAWINGS

The accompanying drawings, together with the specification, illustrate exemplary embodiments, and, together with the description, serve to explain the principles of these embodiments.

FIGS. 11A and 11B illustrate an example of electrospinning a 15% PS-PI-PS in 75:25 THF:DMF polymer solution onto a separator with the glass mat removed and the rib side up.

DETAILED DESCRIPTION

The detailed description is intended to provide a description of various exemplary embodiments of the present invention and is not intended to represent the only embodiments in which the invention may be practiced. The term "exemplary" used throughout this disclosure means "serving as an example, instance, or illustration," and should not necessarily be construed as preferred or advantageous over other embodiments. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Various aspects of the present invention may be described with reference flooded lead acid batteries. However, as those skilled in the art will appreciate, this disclosure is of equal use with other lead acid batteries, such as valve regulated lead acid batteries, including AGS lead acid batteries and gel lead acid batteries.

Figure 1:
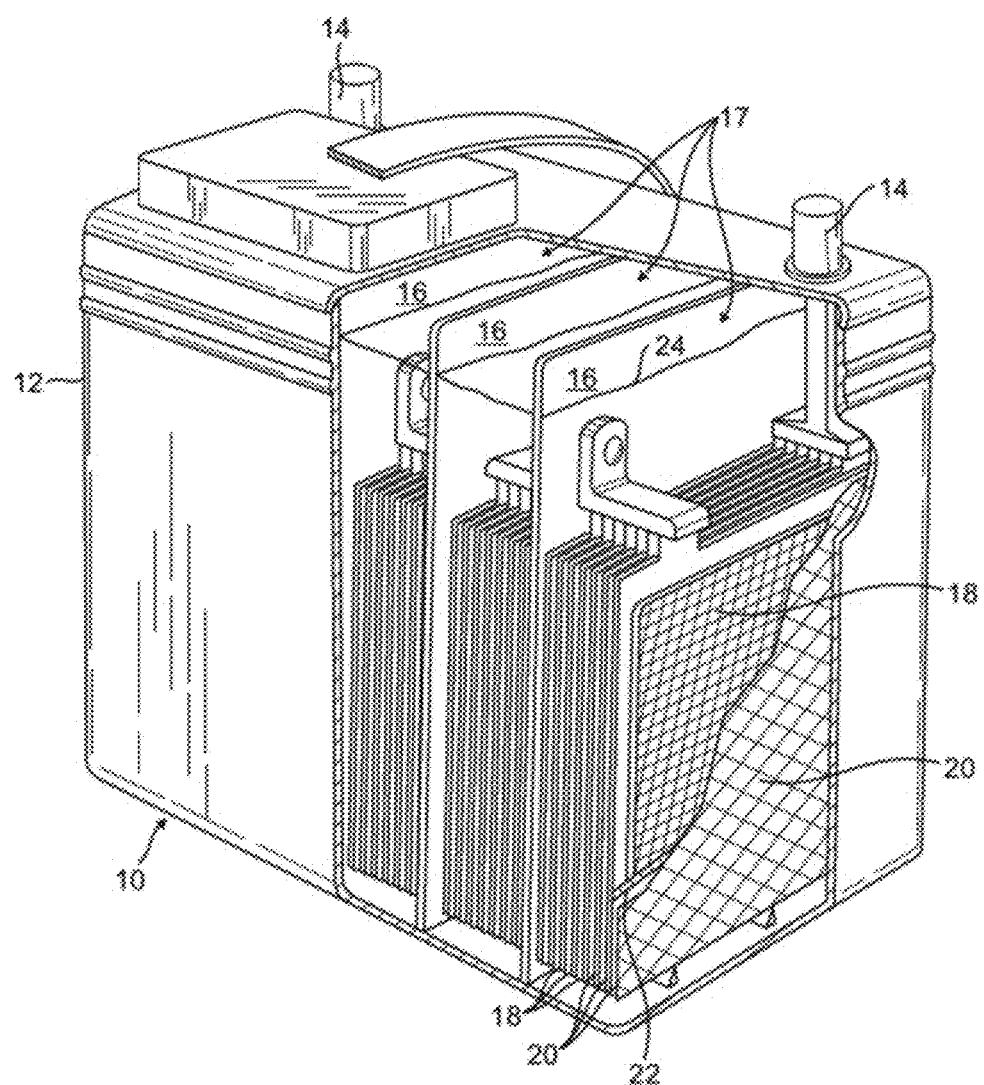
FIG. 1 is a partially cutaway perspective view illustrating one aspect of a lead acid battery with electrodes.

FIG. 1 is a partially cutaway perspective view illustrating one aspect of the construction of a flooded lead acid battery. The lead-acid battery 10 includes a housing 12 having positive and negative terminal posts 14 extending through the top of the housing to allow for electrical clamps to connect to the battery in operation.

A number of vertical partition walls 16 create a plurality of separate cell compartments 17. Each cell compartment contains a vertical stack of negative plates 18 and positive plates 20 having opposing faces spaced apart by separators 22 all immersed in an electrolyte 24, such as sulfuric acid ($H_2SO_4$).

A coating of a porous, non-woven mat comprised of polymer fibers is formed on at least one side of at least one component of a lab battery. The component may be a positive electrode plate or a negative electrode. Alternatively, the component may be a separator or separator component.

The polymer fiber coating, which in one aspect is a porous, non-woven mat, can be made of any suitable polymer fiber. Representative polymer fibers include, without limitation, cellulose acetate, polystyrene, polyethylene and Nylon 6 polymer fibers. Other suitable polymer fibers include, without limitation carboxymethyl cellulose (CMC), Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene terephthalate (PET), Polyphenyl ether (PPE), Polyvinyl chloride (PVC), Polyvinylidene chloride (PVDC), Polyvinylidene fluoride (PVDF), Poly(vinylidenefluoride-co-hexafluoropropylene (PVDF-HFP), Polyvinyl-pyridine, Polylactic acid (PLA), Polyolefins including but not limited to, Polypropylene (PP), Polybutylene (PB), Polybutylene terephthalate (PBT), Polyamide (PA), Polyimide (PI), Polycarbonate (PC), Polytetrafluoroethylene (PTFE), Polyester (PE), Acrylonitrile butadiene styrene (ABS), Poly(methyl methacrylate) (PMMA), Polyoxymethylene (POM), Polysulfone (PES), Styrene-acrylonitrile (SAN), Polyacrylonitrile (PAN), Styrene-butadiene rubber (SBR), Ethylene vinyl acetate (EVA), Styrene maleic anhydride (SMA), Polyisoprene (PI), Natural Rubber (NR), Cellulose, Cellulose Acetate (CA), Polyaniline (PANT), Polyacrylonitrile (PAN), Poly (ε-caprolactone) (PCL), Chitosan, Gelatin, Polyurethanes (PU), Poly (3-hydroxybutrate-co-3-hydroxyvalerate) (PHBV) fibers and combinations thereof In another aspect, the polymer fibers are cellulose acetate, polystyrene, polyethylene or Nylon 6 fibers. And in one aspect the fibers are polystyrene-polyisoprene-polystyrene (PS-PI-PS) co-polymer fibers.

The polymer fibers may be nanofibers having a small fiber diameter, large surface area, high porosity and a controlled thickness. For example, in some embodiments, the fibers have a fiber diameter of from about 5 nm and about 30 μm and in some embodiments, the fibers have a fiber diameter of from about 500 nm to about In other embodiments, the coating 30 has a surface area of from about 5 $m^2/g$ to about 500 $m^2/g$, and in some other embodiments, the coating has a surface area of from about 50 $m^2/g$ to about 200 $m^2/g$.

In one embodiment, the coating has a porosity of from about 30% to about 90% and in another embodiment, the coating has a porosity of from about 50% to about 70%. In one embodiment, the coating has a thickness of from about 2 μm to about 2 mm, in another embodiment, the coating has a thickness of from about 5 μm to about 500 μm, and in some other embodiment, the coating has a thickness of from about 20 μm to about 250 μm.

Those skilled in the art will be readily able to determine the suitable diameter, surface area, porosity and thickness of the coating depending on the overall design parameters and the specific application.

In another embodiment, the coating additionally contains at least one active agent. The active agent can be any material that further enhances the mechanical and physical properties of the coating. Useful active agents include, without limitation, natural rubber to reduce the migration of antimony from the positive to the negative plates (18, 20) and diminish the impact of antimony poisoning such as electrolyte expenditure and loss of capacity; other rubbers, such as RSS 1 and V 60 rubber; macromolecules, such as lignin, including Indulin AT, to decrease sulfation and stratification, chelating agents, such as acetylacetone and EDTA and carbon materials, including graphite and carbon black, such as CyPbrid 1 to increase charge acceptance and decrease sulfation. Other suitable active ingredients include sulfates, such as barium sulfate which can be employed in the unwoven mat as a nucleating agent and tin sulfate which can be integrated into the unwoven mat to dissolve into the lead acid battery electrolyte and reduce the particle size of $PbO_2$. Carbon additives, such as graphite, can be introduced into the unwoven mat to produce areas of conductivity in the flooded lead acid battery and/or change the potential of the electrodes.

In one embodiment, the coating is a porous, nanofiber mat formed by an electrospinning. process. Electrospinning is a technique that produces polymeric fibers that can be coated onto different material surfaces. An electrically charged solution (usually polymer based) is deposited producing a porous, non-woven mat of fibers. The coatings can have a number of attractive properties such as small fiber diameters, large surface area, small pore size, high porosity and controllable thickness as well as the capability to be functionalized using different additives. The electrospun polymeric fiber coating may be formed using a charged polymer solution and a lead acid battery electrode plate or a metal foil substrate, such as an aluminum foil substrate as the grounded or oppositely charged collection plate.

A large variety of materials and solvents can be combined in the polymeric solution in order to tailor specific properties and functionalities. Suitable polymers include, without limitation, cellulose acetate, polystyrene, polyethylene and Nylon 6 fibers. Other suitable polymers include carboxymethyl cellulose (CMC), Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene terephthalate (PET), Polyphenyl ether (PPE), Polyvinyl chloride (PVC), Polyvinylidene chloride (PVDC), Polyvinylidene fluoride (PVDF), Poly(vinylidene-fluoride-co-hexafluoropropylene (PVDF-HFP), Polyvinylpyridine, Polylactic acid (PLA), Polyolefins including but not limited to, Polypropylene (PP), Polybutylene (PB), Polybutylene terephthalate (PBT), Polyamide (PA), Polyimide (PI), Polycarbonate (PC), Polytetrafluoroethylene (PTFE), Polyester (PE), Acrylonitrile butadiene styrene (ABS), Poly(methyl methacrylate) (PMMA), Polyoxymethylene (POM), Polysulfone (PES), Styrene-acrylonitrile (SAN), Polyacrylonitrile (PAN), Styrene-butadiene rubber (SBR), Ethylene vinyl acetate (EVA), Styrene maleic anhydride (SMA), Polyisoprene (PI), Natural Rubber (NR), Cellulose, Cellulose Acetate (CA), Polyaniline (PANT), Polyacrylonitrile (PAN), Poly ($\varepsilon$-caprolactone) (PCL), Chitosan, Gelatin, Polyurethanes (PU), Poly (3-hydroxybutrate-co-3-hydroxyvalerate) (PHBV) fibers and combinations thereof. Alternatively, the polymers may be polystyrene-polyisoprene-polystyrene (PS-PI-PS) co-polymer fibers, or any other suitable co-polymer fibers.

Suitable solvents include liquids that are solvents for the polymer and that can sustain a charge, i.e., form a charged polymer solution. Representative solvents include, without limitation formic acid, dimethyl formamide (DMF), Nylon 6 in formic acid, cellulose acetate in DMF an tetrahydrofuran (THF) in DMF being presently preferred polymeric solution. Other suitable solvents include N-Methylpyrrolidone (NMP), acetone, ethyl acetate, propyl acetate, water, dichloromethane, tetrahydrofuran, isopropyl alcohol, dicloromethane, ethanol, methanol, chloroform, trifluoroacetic acid, trifluoroethanol, hexafluoro propanol, dimethylacetamide, carbon disulfide, cyclohexane, toluene, N-methylmorpholine, xylenes and dimethylsulfoxide and combinations thereof. Typically, the amount of polymer in the solution is from about 5% to about 30%, in other embodiments, about 10% to about 25%, and in some other embodiments, from about 15 to about 20%, based on % (w/v). In one embodiment, the solvent may be a combination of DMF and THF, or any other suitable combination.

In one embodiment, the polymer solution contains at least one active agent to impart additional properties to the coatings. Representative active agents include, without limitation, natural rubber, synthetic rubber, such as RSS 1 and V 60 rubber, macromolecules, such as lignin, including Indulin AT, in a suitable solvent, such as DMF, to decrease sulfation and stratification. Other active ingredients include chelating agents, such as acetylacetone and EDTA, silica and carbon black, such as CyPbrid 1 to increase charge acceptance and decrease sulfation.

The solvent for the active agent can be the same as or different than the solvent for the polymer. For example, in one embodiment the active agent is Indulin AT and the solvent for the Indulin AT is dimethyl formamide (DMF). Typically, the amount of active agent in the polymer solution is from about 10% to about 50%, in other embodiments, about 20% to about 40%, and in some other embodiments, from about 25% to about 40%, based on % (w/v).

Representative embodiments of the polymeric solution include:

18:1 polystyrene:indulin at 25% (w/v) in DMF
25% (w/v) Nylon-6 in Formic acid or
10:1 cellulose acetate:indulin AT 20% (w/v) in DMF Parameters which may affect the formation of fibers include solution properties (e.g., conductivity, surface tension, viscosity, and elasticity), the distance between the capillary tube, electric potential at the capillary tip, and ambient parameters (e.g., humidity, solution temperature, and air velocity).

Various methods may be used for making coated components. For example, a spinneret is connected to a high voltage direct current power supply, such as a 5 to 30 kV direct current power supply. The voltage supply may depend upon such factors as the type of polymer used, the desired porosity, and the rate of production.

The polymer solution is loaded into the spinneret and the electrically charged liquid extruded through the tip of the spinneret toward the surface of the electrode plate collector at a constant rate using a suitable pump. Typically, the flow rate is from about 0.001 ml/min to about 10 ml/min, in some embodiments, about 0.025 to about 1 ml/min, and in some embodiments, from about 0.1 to about 1 ml/min. The diameter of the fibers may be controlled by adjusting the solvent concentration in the polymer solution, adjusting a gap distance between the tip of the metallic needle and the grounded surface of the electrode structure.

Charged threads of the polymer solution are drawn to a negatively charged or grounded electrode plate collector positioned at a predetermined distance below the tip of the spinneret and the polymer solution coated on the surface of the plate until the desired coverage is achieved. In some embodiments the plate is positioned from about 10 mm to about 1,000 cm below the tip of the spinneret, in other embodiments, about 1 to about 50 cm below the tip of the spinneret, and in some other embodiments, from about 5 to about 20 cm below the tip of the spinneret. The present method can be employed as a continuous process.

In accordance with another embodiment, the porous, non-woven mat is formed from a polymer melt. Polymers which are molten at high temperatures may be used in the melt process. Electrospinning of the polymer melt is similar to the process for electrospinning of the polymer solution, however, electrospinning of the polymer melt is performed in a vacuum environment. The charged melt jet, substrate that the melt is deposited on are typically encapsulated in a vacuum environment. Exemplary polymers which may be electrospun in melt form include Polyethylene (PE), Polypropylene (PP), Nylon 12, PA-12, Polyethylene terephthalate (PET), Polyethylene napthalate (PEN), PET/PEN blends, and combinations thereof.

In some embodiments, the polymer melt contains at least one active agent to impart additional beneficial properties to the coatings. Representative active agents include, without limitation, natural rubber, synthetic rubber, such as RSS 1 and V 60 rubber, macromolecules, such as lignin, including Indulin AT. Other active ingredients include chelating agents, such as acetylacetone and EDTA, silica and carbon black, such as CyPbrid 1.

Figure 2:
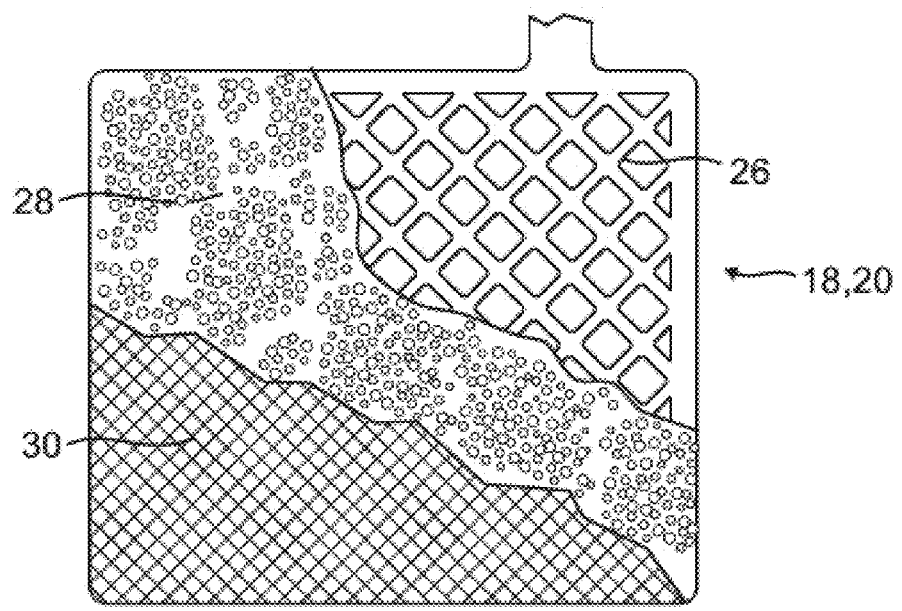
FIG. 2 is a partially cutaway front elevation view illustrating one aspect of an electrode plate coated with a porous, non-woven mat comprised of polymer fibers.

Referring now to FIG. 2, there is shown a partially cutaway front elevation view illustrating an exemplary electrode plate having coating with a porous, non-woven mat comprised of polymer fibers The negative and positive electrode plates 18, 20 are constructed with an underlying electrode grid 26. The electrode grid is primarily formed of lead and, typically, is alloyed with antimony, calcium or tin, generally with antimony.

An active material paste 28 is applied to the electrode grid. The positive and negative active material pastes generally comprise lead oxide (PbO) or lead (II).

As shown in FIG. 2, lead acid battery electrode plates 10 include a porous, non-woven web or mat coating 30 comprised of polymeric fibers on at least one face of the positive electrode plates and/or the negative electrode plates.

The amount of active agent in the coating 30 can vary depending on the active agent, the polymer fiber and the properties of the coating. Typically, the amount of active agent is from about 200:1 to about 1:1, and in other embodiments, from about 100:1 to about 10:1, based on weight:weight ratio.

The porosity can be controlled to allow electrolyte access to plate surface. The unwoven mat coatings may be very porous and allow easy transport of the $H_2SO_4$ electrolyte 24 to the electrode plate. $H_2SO_4$ is a medium for the electrochemical reactions that take place in the battery. $H_2SO_4$ is also a reactant, and it is a drawback of other less porous coatings that they may reduce its reactivity.

Further, the coatings 30 are durable and flexible. The coatings can expand and contract along with the electrode plates. Still further, the coatings can introduce functionalities via the action of the coating or active agents contained within the coating. These can include but are not limited to improved micro/nanostructure of the plate through optimized crystallization. The coating can establish nucleating points and/or face selective adsorption for controlled crystal growth of particles. The coating can introduce areas of high conductivity and capacitance to accelerate the electrochemical processes, reduce gassing and poisoning of plates, e.g. inhibiting migration of antimony to the negative plates. The coating can also produce solubility enhancement of lead based particles undergoing electrochemical conversion. In one embodiment, the electrode grids 28 are primarily constructed of lead and, in some embodiments, the lead is alloyed with antimony, calcium, or tin to improve the mechanical characteristics of the electrode plates. Antimony is generally a preferred alloying material. According to one embodiment, the positive electrode plates are made from a lead-antimony alloy. In one embodiment, the electrode grids are alloyed with about 2 wt % to about 11 wt. % antimony. In another embodiment, the electrode grids are alloyed with between about 2 wt. % and about 6 wt. % antimony. The negative electrode grids are similarly made from an alloy of lead and antimony, but generally include less antimony than the alloy used for the positive electrode grids. The negative electrode grids also tend to be somewhat thinner than the positive electrode grids.

In one embodiment, an active material paste 28 is applied to the electrode grid 26. The positive and negative active material pastes generally comprise lead oxide (PbO) or lead (II). The coated electrode plates 18, 20 may be incorporated in flooded lead acid batteries 10 or other suitable batteries. The flooded lead acid battery includes a housing 12. The housing contains a negative electrode plate 18 with a first face and a positive electrode plate 20 with a second face opposing the first face; a separator 24 positioned between the first and second electrode plate faces and an electrolyte 26 immersing the negative electrode plate, the positive electrode plate the separator.

The polymer fiber coatings are inert and durable. The polymer fiber coatings can survive the environment inside a lead acid battery. The non-woven web deposited on the surface of the plate will not get washed/removed from the surface of the plate.

The electrospun webs may improve the physical and mechanical properties of the lead acid batteries. For example, dendrite formation on a negative plate can lead to short circuits that have detrimental effect on the operation of a battery. The deposition of a porous mat reduces this as the fibers act as a barrier of the dendrite growth on the battery's surface.

The electrospun coating can reduce this hard sulfation by integration of additives that control the nucleation of $PbSO_4$ crystals or bind to $PbSO_4$ limiting the crystal size growth on the surface, thereby increasing capacity and cycle life of the battery.

In other embodiments lead acid battery separators 28 include a porous, non-woven web or mat coating, such as the electrospun coatings, comprised of polymeric fibers on at least one face of the separator or their individual components. Useful separators include, but are not limited to, Cellforce® separators, available from Microporous, LLC, Piney Flats, Tenn.

The coating is formed by electrospinning the polymer solution on to a continuous disposable substrate, such an aluminum foil substrate with a grease proof paper backing and then rolling it (the electrospun mat on substrate) up. When it is time to use the electrospun mat, the roll is unwound and the "backing paper' peeled off and disposed of. Suitable polymer solutions include, but are not limited to a combination of polymer and solvent, such as a 15% solution of PS-PI-PS (polystyrene-polyisoprene-polystyrene co-polymer) in 75:25 THF:DMF and 8% liquid natural rubber in 15% PS-PI-PS 75:25 THF:DMF. In some embodiments, the polymer solution additionally contains at least one active ingredient, such as Polyvinylpyrrolidone (PVP) or Titanium Dioxide.

The polymer solution is first loaded into a syringe and pumped at a controlled flow rate through tubing and into a metallic needle tip of defined diameter. A fixed voltage is delivered to the needle which initiates electrospinning of fibers and deposits these fibers on to the substrate which is grounded by a metal collector plate.

The coatings can expand and contract along with the separator.

Components of the LABs may comprise a first plate and a second plate, each plate comprising a current conductor (e.g., a lead grid) having an electrochemically active material on one or more surfaces thereof. Other components of the LABs may comprise a separator. The separator may comprise a low-conducting and/or non-conductive material. Materials useful for the separator include, but are not limited to, rubber, polyethylene, glass (including glass microfibers), and combinations thereof. According to some aspects, the separator may substantially consist of only the electrospun coating material.

One or more of the LAB components may be provided with an electrospun coating. The coating may be adhered to (or embedded onto) one or more surfaces of the component(s). The coating's composition may be selected such that the coating has certain acceptable, functional features.

For example, the coating may comprise fibers selected such that the coating has acceptable elasticity. "Acceptable elasticity" may, in some cases, refer to elasticity adequate for the coating to expand and contract along with the normal growth and shrinkage of, for example, the plate(s)' active material as the LAB cycles.

Additionally or alternatively, the coating polymer fibers may be used to inhibit or eliminate active material from shedding from the plate surface. Shedding often leads to reduced utilization of the plate(s), resulting in loss in capacity as well as causing a failure modes such as Bottom Moss Shorts (BMS). BMS occur when there is an accumulation of active material that has fallen (or been shed) from the plate. The accumulated "moss" grows until it comes in contact with the bottom of the plate(s), thereby forming a bridge and shorting the cell. In various embodiments, the coating may act as a flexible net inhibiting or stopping active material shedding from the plate surface.

Additionally or alternatively, the coating may have an acceptable porosity. "Acceptable porosity" may, in some cases, refer to porosity such that the coating allows acceptable access of electrolytes for the LAB cells' electrochemical processes.

The electrospun coating may be provided to the LAB component(s) by depositing an electrically-charged polymer to produce a porous, non-woven mat of fibers. The fibers may contain polystyrene (PS), polyisoprene (PI), or combinations thereof. In some preferred embodiments, the fibers may comprise PS-PI-PS co-polymers. The coating may comprise 5% PS-PI-PS co-polymers, optionally 10%, 15%, 20%, 25%, or any other suitable percentage.

Alternatively or additionally, the coating may comprise one or more secondary material(s). Electrospinning of the secondary material(s) may be facilitated by the production of the fibers. Examples of secondary materials include, but are not limited to, natural rubbers (e.g., to introduce an anti-antimony migration effect), PVP, titanium dioxide, and combinations thereof. The coating may comprise 5% of a secondary material, optionally 8%, 10%, or other suitable percentage.

The present disclosure also relates to methods of making the electrospun coatings as described herein. The method may include one or more electrospinning steps. An exemplary method may be a one-step and/or on-line process. The method may be performed before, during, and/or after the manufacturing of a LAB comprising the coated component(s).

For example, the coating may be provided onto the LAB component during a LAB manufacturing process. The coating may be provided in a spray housing unit with a conveyer of components (e.g., pates) passed underneath the spray area. Additionally or alternatively, a roller may be used to embed the coating into the surface of the component. The coating may be applied at any point during the manufacturing process, for example, post pasting and post tunnel dryer etc.

In one example, the method may comprise providing a polymer solution of PS-PI-PS (15% w/v) in a mixture of tetrahydrofuran (THF) and dimethylformamideis (DMF) (for example, 75:25 THF:DMF). The polymer may be deposited on one or more elements of the component using an electrospin emitter. Specifically, an electric charge may be applied to the solution for an amount of time such that the component or elements thereof are sufficiently coated.

The polymer solution may be loaded into a syringe and pumped at a controlled flow rate through tubing and into a metallic needle tip of a defined diameter. A fixed voltage may be delivered to the needle which initiates electrospinning of fibers and deposits these fibers on to the substrate (e.g., a LAB component or element thereof), which is grounded by a metal collector plate.

Figure 3:
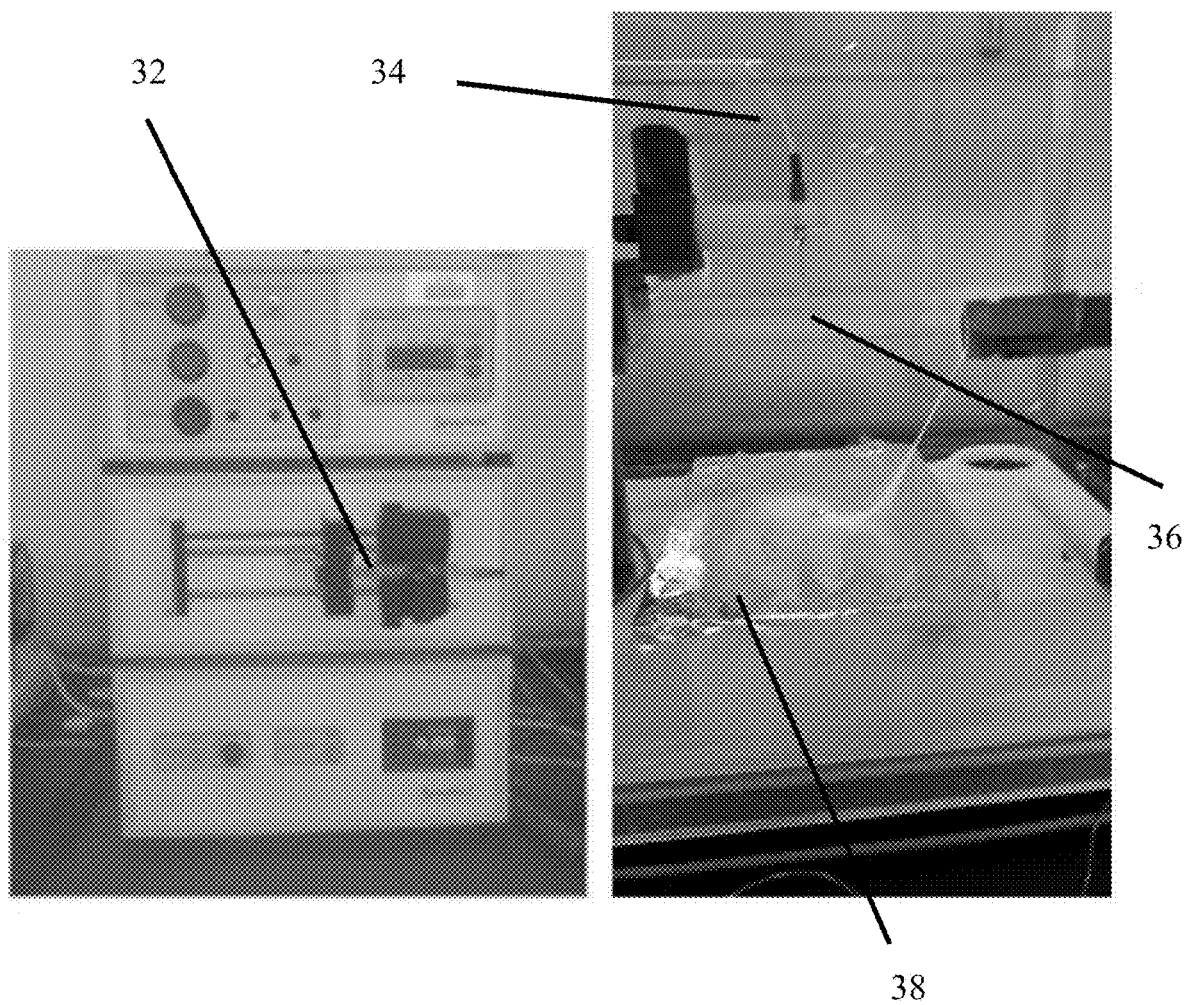
FIG. 3 illustrates an exemplary equipment set-up to electrospin onto an aluminum foil substrate with the needle in vertical position.

In one embodiment, a polymer solution may be electrospun onto substrate through vertical electrospinning. FIG. 3 demonstrates a process of electrospinning onto an aluminum foil substrate (38) with needle (36) in the vertical position. As an example, a polymer solution comprises PS-PI-PS co-polymers for electrospin or the polymer solution further comprises a secondary material for electrospin (e.g. PVP and Titanium Dioxide). This solution is loaded into a syringe (32) and pumped at a controlled flow rate through tubing (34) and into a metallic needle tip (36) of defined diameter. A fixed voltage is delivered to the needle which initiates electrospinning of fibers and deposits these fibers on to the substrate (38) which is grounded by a metal collector plate (covered by aluminum foil).

Figure 4:
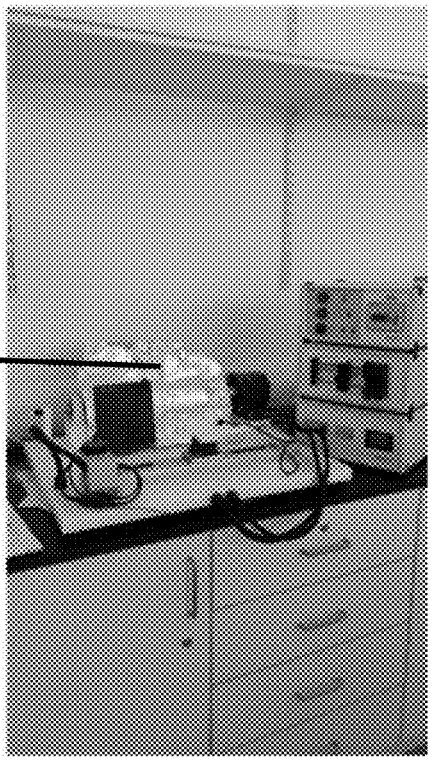
FIG. 4 illustrates an exemplary equipment set-up to electrospin with the needle in the horizontal position.

In another embodiment, a polymer solution may be electrospun onto substrate through horizontal electrospinning. FIG. 4 demonstrates an equipment set-up to electrospin on to an aluminum foil substrate (42) with needle in the horizontal position. Other conditions are comparable to Example 1.

Figure 5:
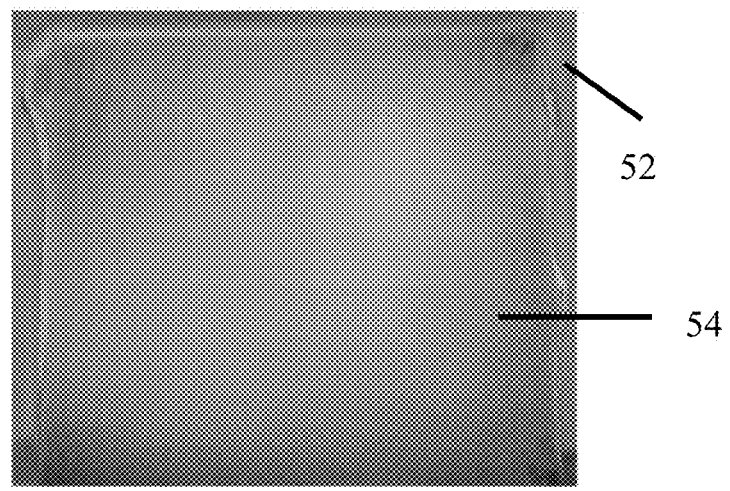
FIG. 5 illustrates an example electrospun coated plate.
Figure 6:
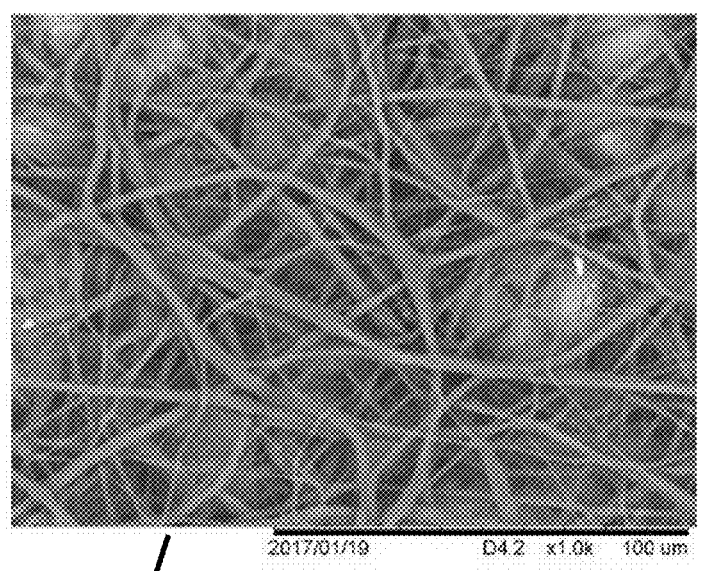
FIG. 6 illustrates a scanning electron microscope (SEM) image of an exemplary electrospun coating on a plate.

In another embodiment, electrode plates may be electrospun coated. A polymer solution of PS-PI-PS (15% w/v) in a mixture of THF/DMF is deposited using an electrospin emitter. An electric charge is applied to the solution and the target substrate is coated for the desired duration. A photo of a coated plate (52) is illustrated in FIG. 5. The edge of the plate (52) is not visible in this figure. As discussed herein, the resulting coating (54) may act as an elastic netting that adheres to (or embedded onto) the plate surface. The coating may improve the structural integrity of the plate surface and/or stop active material shedding from the plate. The coating may comprise a highly porous mat that allows free access of electrolytes to the plate's active material in a LAB. The high porous nature of the mat (54) is demonstrated by SEM in FIG. 6. The elastic nature of the material also allows it to expand and contract with the plate as it discharges and charges.

Figure 7A:
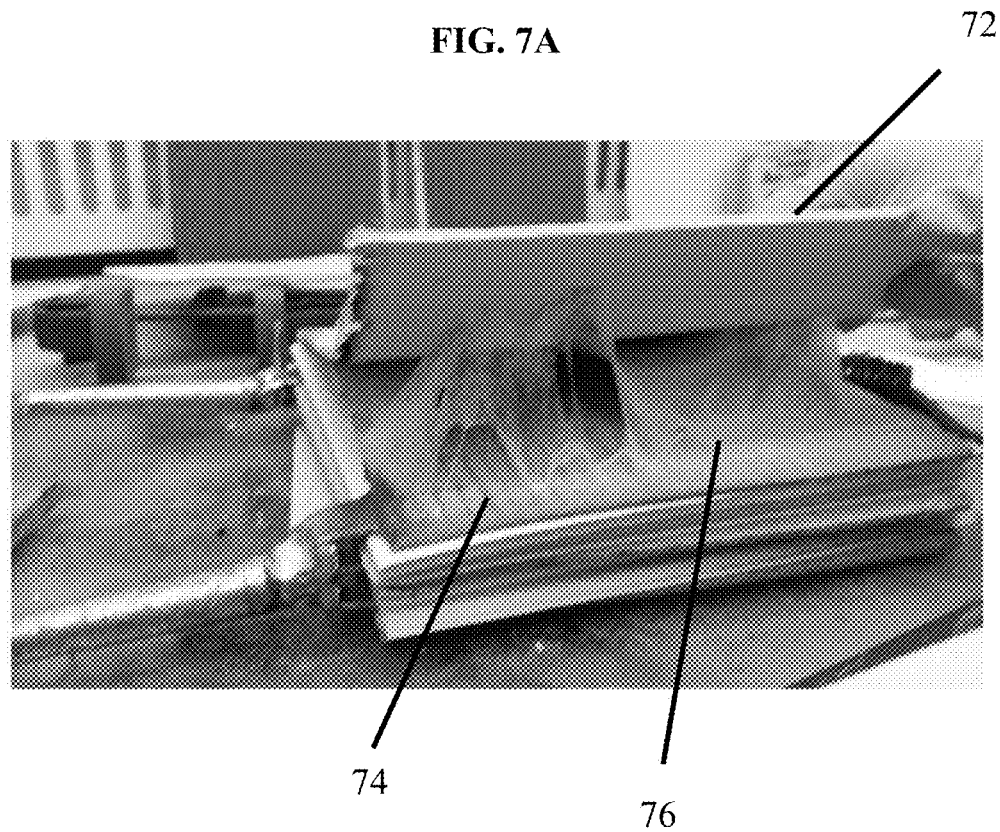
FIGS. 7A and 7B illustrate two photographs of an exemplary lead acid battery cell having an electrospun coating.
Figure 7B:
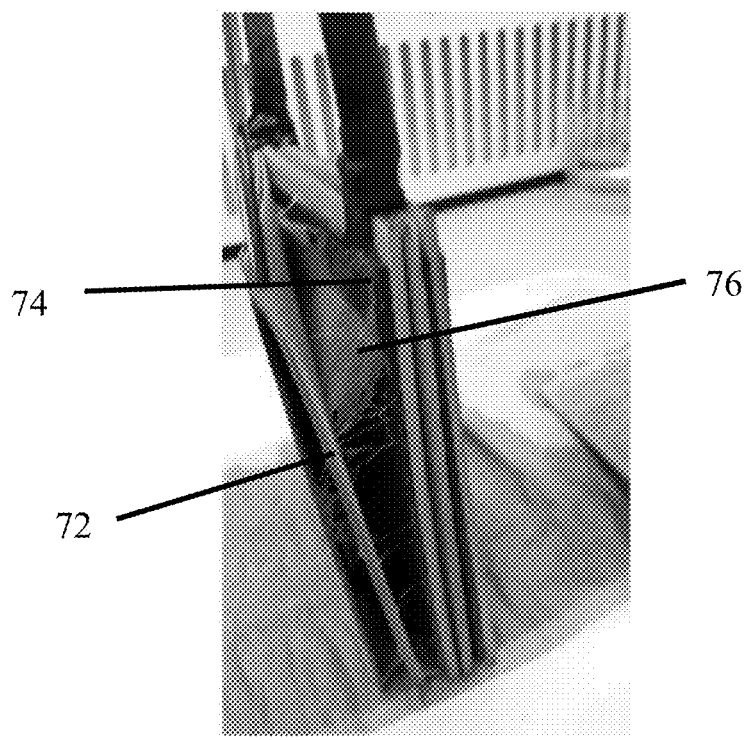

In another embodiment, the substrate impacts on electrospun coating were examined. FIGS. 7A and 7B demonstrate two assembled battery cells comprising electrode plates and separators. In the figures, 72 is a separator and 74 is an electrospun coated electrode plate. The web like structure between the separator (72) and the electrode plate (74) is the electrospun coating/polymer mat (76). The electrode plate is made of conductive materials.

Figure 8:
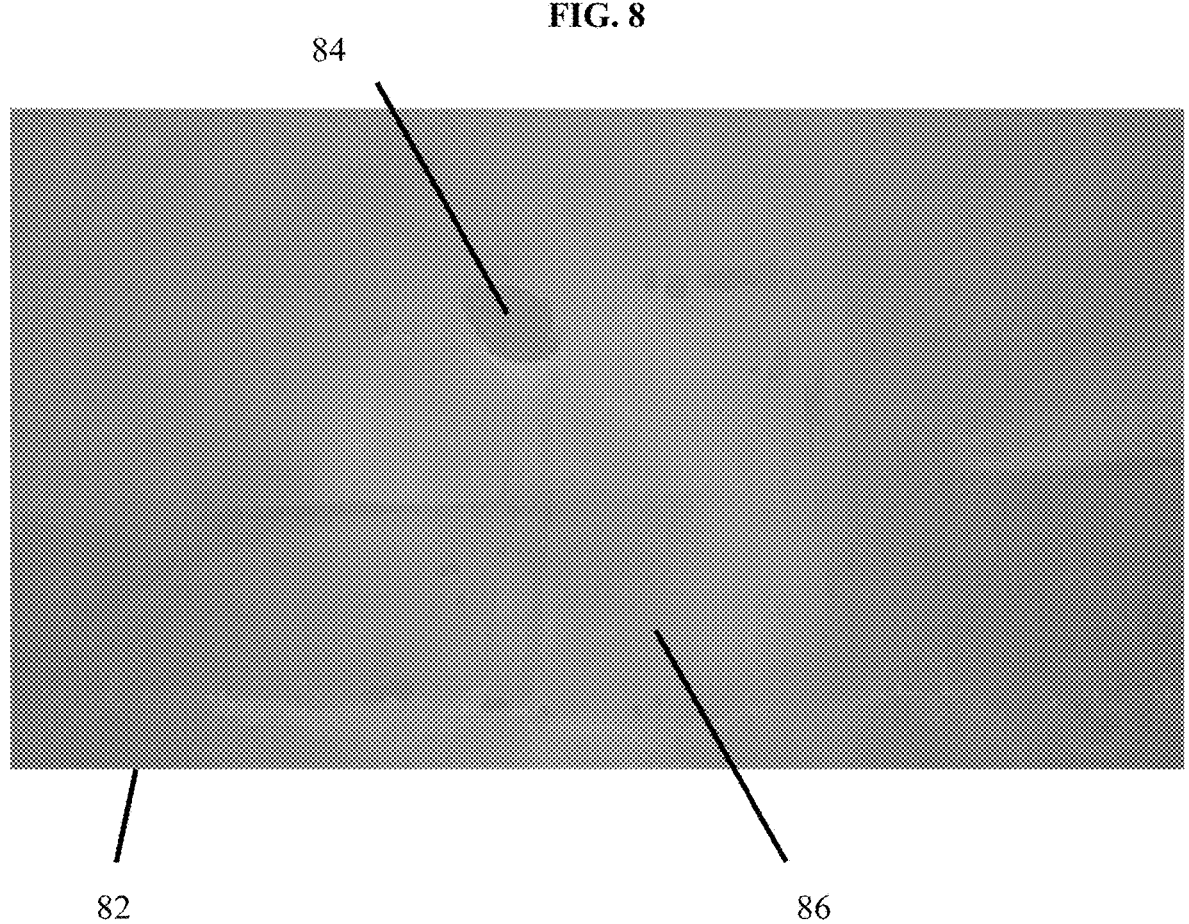
FIG. 8 illustrates an exemplary electrospun coated greaseproof paper, which is a non-conductive test material.

FIG. 8 shows greaseproof paper (82), a non-conductive test material, which is electrospun coated according to the present disclosure. As seen in FIG. 8, holes (84) were purposely put in the electrospun coating to help distinguish the presence of the white electrospun coat (86) from the white greaseproof paper (82). A 15% solution of PS-PI-PS (polystyrene-polyisoprene-polystyrene co-polymer) in 75:25 THF:DMF was electrospun on to greaseproof paper. The co-polymer electrospun well on to the greaseproof paper.

SEM analysis confirmed there were no observable changes in the fiber size/morphology due to change in substrates. The electrospun coatings on the electrode plates (conductive) and on the greaseproof paper (non-conductive) have a substantially similar fiber size and/or fiber morphology regardless of the materials of the substrates.

In another embodiment, a separator and the elements of the separator were electrospun coated. Electrospun coating on to a separator of a LAB was investigated using a commercial Cellforce® separator. Three separate experiments on various elements of Cellforce® separator were performed.

A glass mat, which had been removed from a commercial Cellforce® separator

A Cellforce® separator with the glass mat removed—rib side up

A complete Cellforce® separator—rib side/glass mat facing down

In the three coating experiments, the electrospin solution comprises 15% PS-PI-PS polymer in 75:25 THF:DMF. Subsequently, the above elements or complete set of the separator were electrospun coated with the PS-PI-PS polymer solution.

Figure 9A:
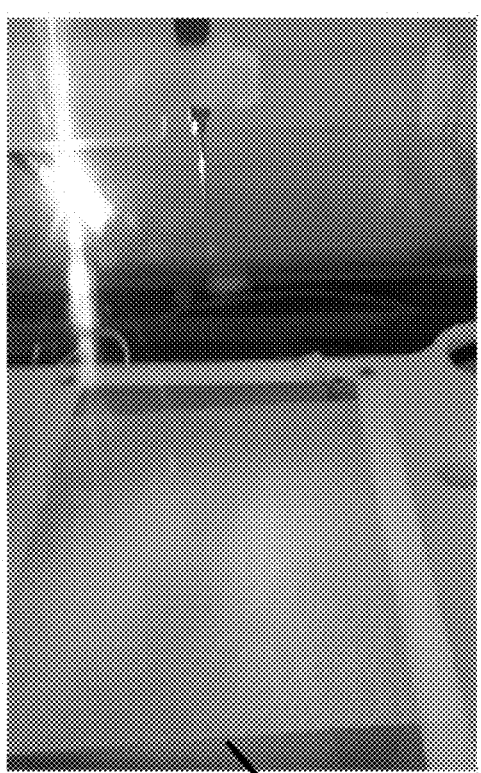
FIGS. 9A and 9b illustrate an example of electrospinning a 15% PS-PI-PS in 75:25 THF (tetrahydrofuran):DMF (dimethylformamide) polymer solution on to a glass mat removed from a separator.
Figure 9B:
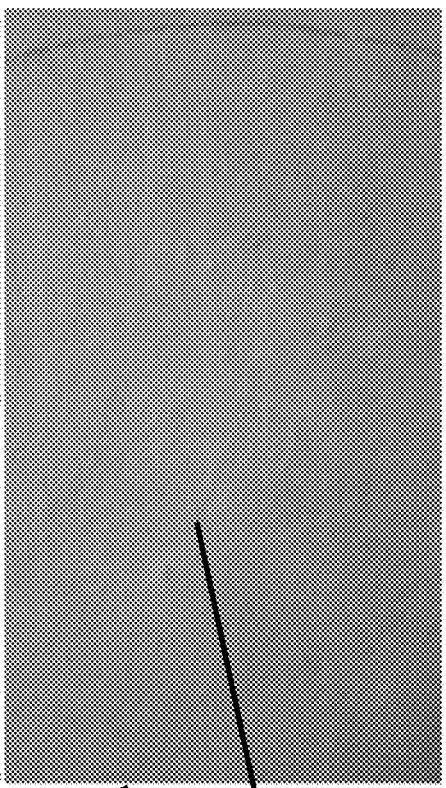

FIGS. 9A and 9B demonstrate an example of electrospinning the 15% PS-PI-PS in 75:25 THF:DMF polymer solution on to the glass mat (92) removed from a Cellforce® separator. The resulting coating (94) is shown in FIG. 9B.

Figure 10:
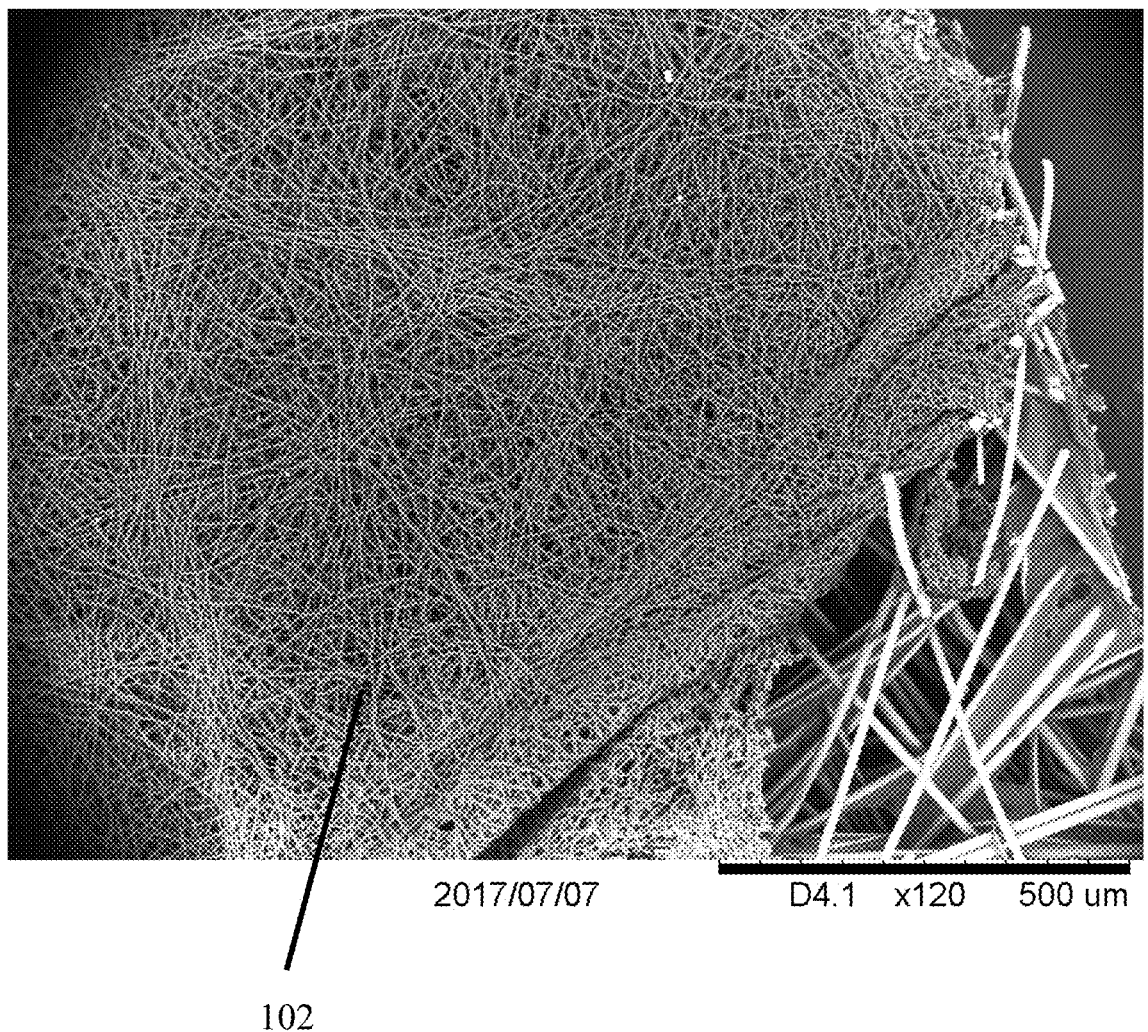
FIG. 10 illustrates an SEM (scanning electron microscope) photograph of an exemplary PS-PI-PS co-polymer electrospun onto a glass mat.

FIG. 10 illustrates an SEM photograph of the 15% PS-PI-PS in 75:25 THF:DMF polymer solution electrospun on to the glass mat removed from a Cellforce® separator. The polymer fibers and polymer net (102) are shown in the figure.

FIGS. 11A and 11B demonstrates an example of electrospinning a 15% PS-PI-PS in 75:25 THF:DMF polymer solution on to a Cellforce® separator (112) with the glass mat removed and the rib (114) side up. The white material near the center of the FIG. 11B is the electrospun fibers (116).

Figure 12:
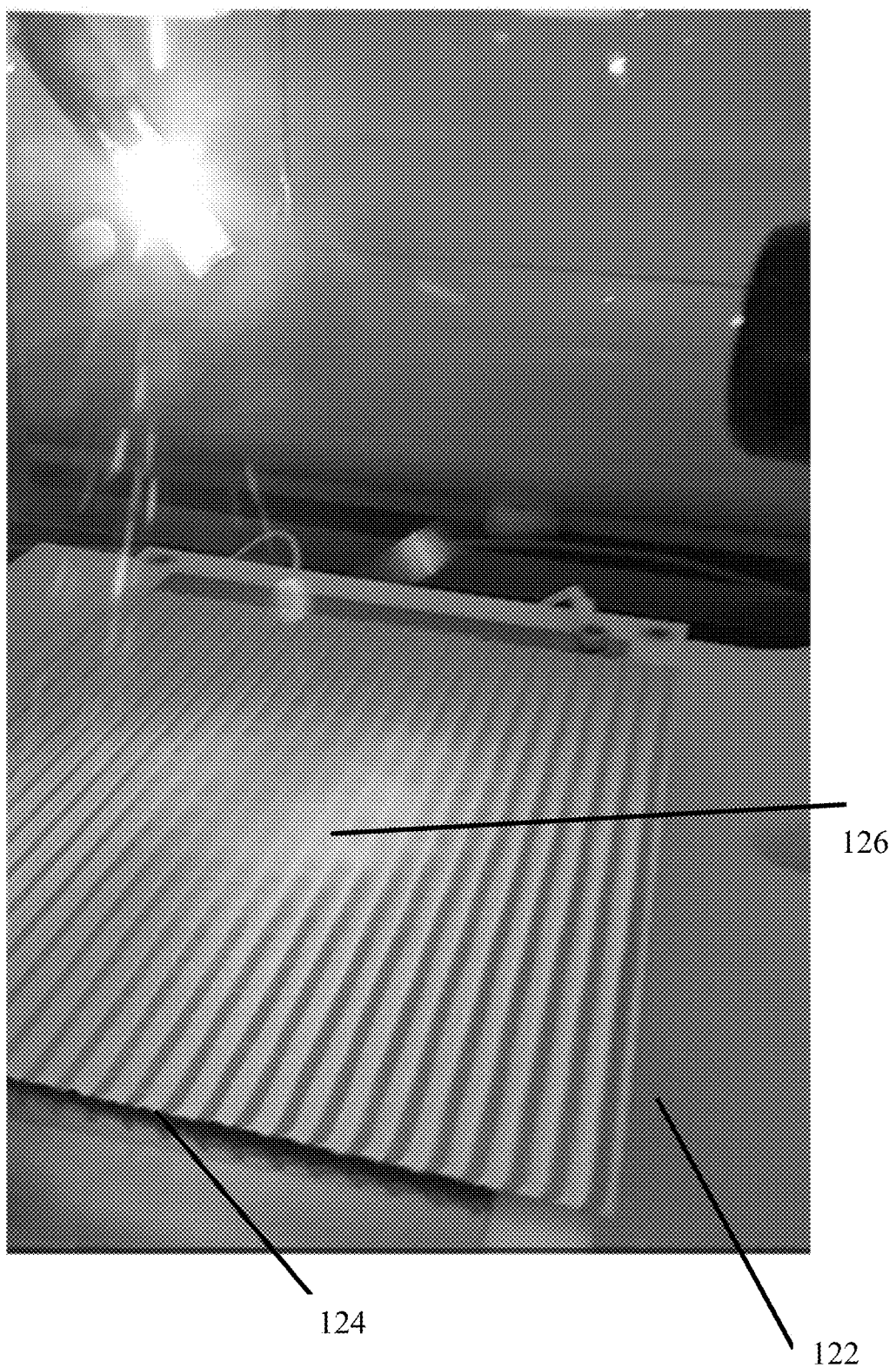
FIG. 12 illustrates an exemplary electrospun coating separator with its glass mat removed using an equipment set-up to electrospin with the needle in vertical position.

FIG. 12 demonstrates an example of vertical electrospinning a 15% PS-PI-PS in 75:25 THF:DMF polymer solution on to a Cellforce® separator (122) with the glass mat removed and the rib (124) side up using an equipment set-up to electrospin with the needle in vertical position. The white material near the center of the figure is the electrospun fibers (126).

Figure 13:
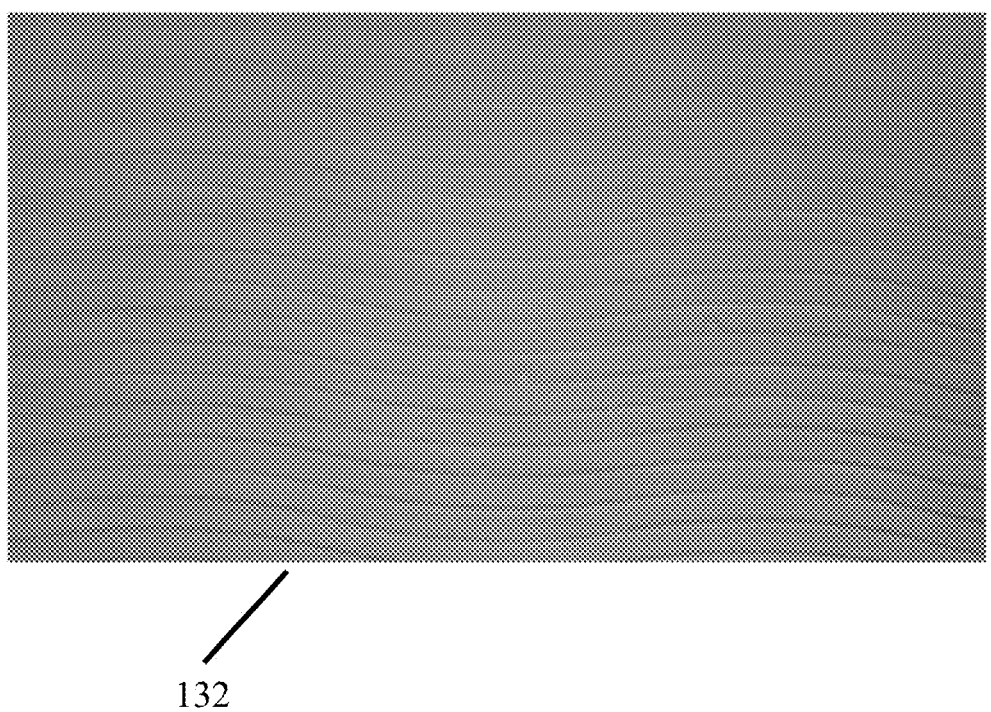
FIG. 13 illustrates an example of electrospinning a 15% PS-PI-PS in 75:25 THF:DMF polymer solution on to a complete separator with rib side/glass mat facing down.

FIG. 13 demonstrates an example of electrospinning a 15% PS-PI-PS in 75:25 THF:DMF polymer solution on to a complete Cellforce® separator (132) with rib side/glass mat facing down. The electrospun coating is deposited on the rib/side of the separator. However, the color of electrospun coating and the color of the substrate are close to each other, rending the electrospun coating invisible.

In another embodiment, a separator and the elements of the separator may be electrospun coated with other polymeric solutions. Cellforce® separators and their components had also been successfully coated with other electrospun materials. One example of such electrospun materials comprises 8% liquid natural rubber ("LNR") in 15% PS-PI-PS 75:25 THF:DMF.

The following tables illustrate representative conditions and compositions used to make an electrospun coating according to the present disclosure. The embodiments, as set forth below, are intended to be illustrative, not limiting. Various changes may be made without departing from the spirit and scope of the disclosure.

TABLE 1

|  | Embodiment 1 | Embodiment 2 | Embodiment 3 | Embodiment 4 |
| --- | --- | --- | --- | --- |
| Composition | LNR in 80:20 THF:DMF | 15% PS-PI-PS in 75.:25 THF:DMF | 15% PS-PI-PS in 75.:25 THF:DMF | 15% PS-PI-PS in 75.25 THF:DMF |
| Polymer M.W. | LNR ~38000 | PS-PI-PS: 207-237 g/mol | PS-PI-PS: 207-237 g/mol | PS-PI-PS: 207-237 g/mol |
| Solution Temp. | Ambient | Ambient | Ambient | Ambient |
| Needle Diameter (mm) | 0.55 | 0.7 | 0.9 | 0.9 |
| Flow Rate (ml/min) | 4 | 12 | 12 | 12 |
| Duration of Deposition (min) | ~5 mins | 4 mins | 4 mins | 4 mins |
| Distance from tip to collector (cm) | 4 cm | 12 cm | 12 cm | 12 cm |
| Applied voltage (kv) | 11.8 | 14 | 10.34 | 10.34 |
| Collector Composition | Aluminum Foil | Greaseproof Paper | Glass Mat (Cellforce) | Cellforce separator (Rib side up with glass mat removed) |
| Chamber Temperature | Ambient | Ambient | Ambient | Ambient |
| Note | Electrospun coating succeeded | Electrospun coating succeeded | Electrospun coating succeeded | Electrospun coating succeeded |

TABLE 2

|  | Embodiment 5 | Embodiment 6 | Embodiment 7 | Embodiment 8 | Embodiment 9 |
| --- | --- | --- | --- | --- | --- |
| Composition | 15% PS-PI-PS in 75:25 THF:DMF | 8% LNR in 15% PS-PI-PS (75:25 THF:DMF) | 8% LNR in 15% PS-PI-PS (75:25 THF:DMF) | 8% LNR in 15% PS-PI-PS in THF:DMF | 8% LNR in 15% PS-PI-PS in THF:DMF |
| Polymer M.W. | PS-PI-PS: 207-237 g/mol | LNR: ~38000 PS-PI-PS: 207-237 g/mol | LNR: ~38000 PS-PI-PS: 207-237 g/mol | LNR: ~38000 PS-PI-PS: 207-237 g/mol | LNR: ~38000 PS-PI-PS: 207-237 g/mol |
| Solution Temp. | Ambient | Ambient | Ambient | Ambient | NM |
| Needle Diameter (mm) | 0.9 | 0.9 | 0.9 | 0.9 | 0.9 |
| Flow Rate (ml/min) | 9 | 12 | 12 | 6 | 8 |

TABLE 2-continued

|  | Embodiment 5 | Embodiment 6 | Embodiment 7 | Embodiment 8 | Embodiment 9 |
|---|---|---|---|---|---|
| Duration of Deposition (min) | 4 mins | 20-30 seconds | 20-30 seconds | 8 mins | ~8 mins |
| Distance from tip to collector (cm) | 12 cm | ~15 cm | ~15 cm | Across at 140 cm on horizontal set up | Horizontal set up 140 cm |
| Applied voltage (kv) | 11 | 15.6 | 15.6 | 10.9 | 16 |
| Collector Composition | Complete Cellforce separator (glass mat facing down) | Glass mat (Cellforce) | Cellforce (rib side up) | Cellforce, glass mat removed, rib side up | Cellforce, glass mat removed, rib side up |
| Chamber Temperature | Ambient | Ambient | Ambient | N/A Horizontal Emitter | N/A Horizontal Emitter |
| Note | Electrospun coating succeeded | Electrospun coating succeeded | Electrospun coating succeeded | Electrospun coating succeeded | Electrospun coating succeeded |

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or any analogous law in any jurisdiction, unless the element is expressly recited using the phrase "means for" or, in the case of a method claim, the element is recited using the phrase "step for."

What is claimed is:

1. A coated separator for a lead acid battery, comprising:
   a separator; and
   a porous, non-woven mat including polymer fibers coating the separator, wherein each of the polymer fibers includes between 5% and 25% of polystyrene-polyisoprene-polystyrene (PS-PI-PS) co-polymers.

2. The coated separator of claim 1, wherein the porous, non-woven mat comprises an electrospun mat.

3. The coated separator of claim 1, wherein the porous, non-woven mat further comprises an active agent selected from the group consisting of natural rubber, RSS 1 rubber, V 60 rubber, a macromolecule, lignin, Indulin AT, a chelating agent, silica, carbon black, and CyPbrid 1.

4. The coated separator of claim 1, wherein the porous, non-woven mat further comprises one or more secondary materials selected from the group consisting of natural rubbers, PVP, and titanium dioxide.

5. The coated separator of claim 1, wherein each of the polymer fibers further includes a polymer selected from the group consisting of cellulose acetate, polystyrene, polyethylene, Nylon 6, carboxymethyl cellulose (CMC), Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene terephthalate (PET), Polyphenyl ether (PPE), Polyvinyl chloride (PVC), Polyvinylidene chloride (PVDC), Polyvinylidene fluoride (PVDF), Poly(vinylidenefluoride-co-hexafluoropropylene (PVDF-HFP), Polyvinyl-pyridine, Polylactic acid (PLA), and Polyolefin.

6. A coated separator for a lead acid battery, comprising:
   a separator; and
   electrospun polymer fibers coating the separator, wherein each of the polymer fibers includes between 5% and 25% of polystyrene-polyisoprene-polystyrene (PS-PI-PS) co-polymers.

7. The coated separator of claim 6, wherein the electrospun coating comprises a porous, non-woven mat.

8. The coated separator of claim 6, wherein the porous, non-woven mat further comprises an active agent selected from the group consisting of natural rubber, RSS 1 rubber, V 60 rubber, a macromolecule, lignin, Indulin AT, a chelating agent, silica, carbon black, and CyPbrid 1.

9. The coated separator of claim 6, wherein the porous, non-woven mat further comprises one or more secondary materials selected from the group consisting of natural rubbers, PVP, and titanium dioxide.

10. The coated separator of claim 6, wherein each of the polymer fibers further includes a polymer selected from the group consisting of cellulose acetate, polystyrene, polyethylene, Nylon 6, carboxymethyl cellulose (CMC), Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene terephthalate (PET), Polyphenyl ether (PPE), Polyvinyl chloride (PVC), Polyvinylidene chloride (PVDC), Polyvinylidene fluoride (PVDF), Poly(vinylidenefluoride-co-hexafluoropropylene (PVDF-HFP), Polyvinyl-pyridine, Polylactic acid (PLA), and Polyolefin.

11. A lead acid battery, comprising:
   a positive electrode plate-;
   a negative electrode plate; and
   a separator between the positive and negative plates, wherein the separator includes a porous, non-woven mat comprising polymer fibers, wherein each of the polymer fibers includes between 5% and 25% of polystyrene-polyisoprene-polystyrene (PS-PI-PS) co-polymers.

12. The lead acid battery of claim 11, wherein at least one of the positive and negative electrode plates comprises a porous, non-woven mat comprising polymer fibers.

13. The lead acid battery of claim 11, wherein each of the polymer fibers further includes a polymer selected from the group consisting of cellulose acetate, polystyrene, polyethylene, Nylon 6, carboxymethyl cellulose (CMC), Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene terephthalate (PET), Polyphenyl ether (PPE), Polyvinyl chloride (PVC), Polyvinylidene chloride (PVDC), Polyvinylidene fluoride (PVDF), Poly(vinylidenefluoride-cohexafluoropropylene (PVDF-HFP), Polyvinyl-pyridine, Polylactic acid (PLA), and Polyolefin.

14. A lead acid battery, comprising:
a positive electrode plate-;
a negative electrode plate; and
a separator between the positive and negative plates, wherein the separator includes a polymeric electrospun coating including between 5% and 25% of polystyrene-polyisoprene-polystyrene (PS-PI-PS) co-polymers.

15. The lead acid battery of claim 14, wherein at least one of the positive and negative electrode plates comprises a polymeric electrospun coating.

16. The lead acid battery of claim 14, wherein the polymeric electrospun coating further includes polymer fibers including a polymer selected from the group consisting of cellulose acetate, polystyrene, polyethylene, Nylon 6, carboxymethyl cellulose (CMC), Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene terephthalate (PET), Polyphenyl ether (PPE), Polyvinyl chloride (PVC), Polyvinylidene chloride (PVDC), Polyvinylidene fluoride (PVDF), Poly(vinylidenefluoride-co-hexafluoropropylene (PVDF-HFP), Polyvinyl-pyridine, Polylactic acid (PLA), and Polyolefin.

* * * * *